United States Patent
Laigneau et al.

(10) Patent No.: US 7,325,479 B2
(45) Date of Patent: Feb. 5, 2008

(54) CARTRIDGE-OPERATED COFFEE-MACHINE

(75) Inventors: Gilles Laigneau, Damigny (FR); Christian Jouatel, Radon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/520,940

(22) PCT Filed: Jul. 11, 2003

(86) PCT No.: PCT/FR03/02189

§ 371 (c)(1),
(2), (4) Date: Jan. 12, 2005

(87) PCT Pub. No.: WO2004/006740

PCT Pub. Date: Jan. 22, 2004

(65) Prior Publication Data

US 2005/0223904 A1  Oct. 13, 2005

(30) Foreign Application Priority Data

Jul. 12, 2002 (FR) .................................. 02 08789

(51) Int. Cl.
*A47J 31/06* (2006.01)
(52) U.S. Cl. .......................................... 99/295; 99/306
(58) Field of Classification Search .......... 99/280–283, 99/287–303, 279, 275, 307, 304, 495, 306; 141/348–350, 18, 21; 426/433, 435
See application file for complete search history.

(56) References Cited

U.S. PATENT DOCUMENTS

| | | | | |
|---|---|---|---|---|
| 3,295,998 A | | 1/1967 | Goros | |
| 4,646,626 A | * | 3/1987 | Baecchi et al. | 99/275 |
| 4,775,048 A | * | 10/1988 | Baecchi et al. | 206/0.5 |
| 5,197,374 A | * | 3/1993 | Fond | 99/295 |
| 5,634,395 A | * | 6/1997 | Jouatel et al. | 99/307 |
| 5,687,636 A | * | 11/1997 | Diore et al. | 99/285 |
| 5,860,354 A | * | 1/1999 | Jouatel et al. | 99/286 |
| 6,216,754 B1 | * | 4/2001 | Geroult et al. | 141/350 |

FOREIGN PATENT DOCUMENTS

| | | |
|---|---|---|
| EP | 0 125 2215 A | 11/1984 |
| EP | 1 208 782 A | 5/2002 |
| FR | 2842090 A1 * | 1/2004 |

* cited by examiner

*Primary Examiner*—Timothy F. Simone
(74) *Attorney, Agent, or Firm*—Browdy and Neimark, PLLC

(57) ABSTRACT

The invention concerns a cartridge-operated coffee-machine, comprising means for supplying hot water to an infusion head adapted to receive at least two different cartridges (2, 2') including each at least one planar seat surface, means for communicating said supply means with the product contained inside the cartridges so as to obtain a beverage, and means for directing said beverage exiting from the cartridge towards a beverage collecting receptacle, where the infusion head comprises a support (11) having at least one pocket (29) forming a housing for at least two different cartridges (2, 2'). The invention is characterized in that said pocket (29) comprises a single peripheral seat (35) common to several cartridges (2, 2') of different seat diameters, one or more portions of the outer rim of said peripheral seat 835 forming an indexing vertical wall common to said cartridges (2, 2').

10 Claims, 5 Drawing Sheets

Figure 1:
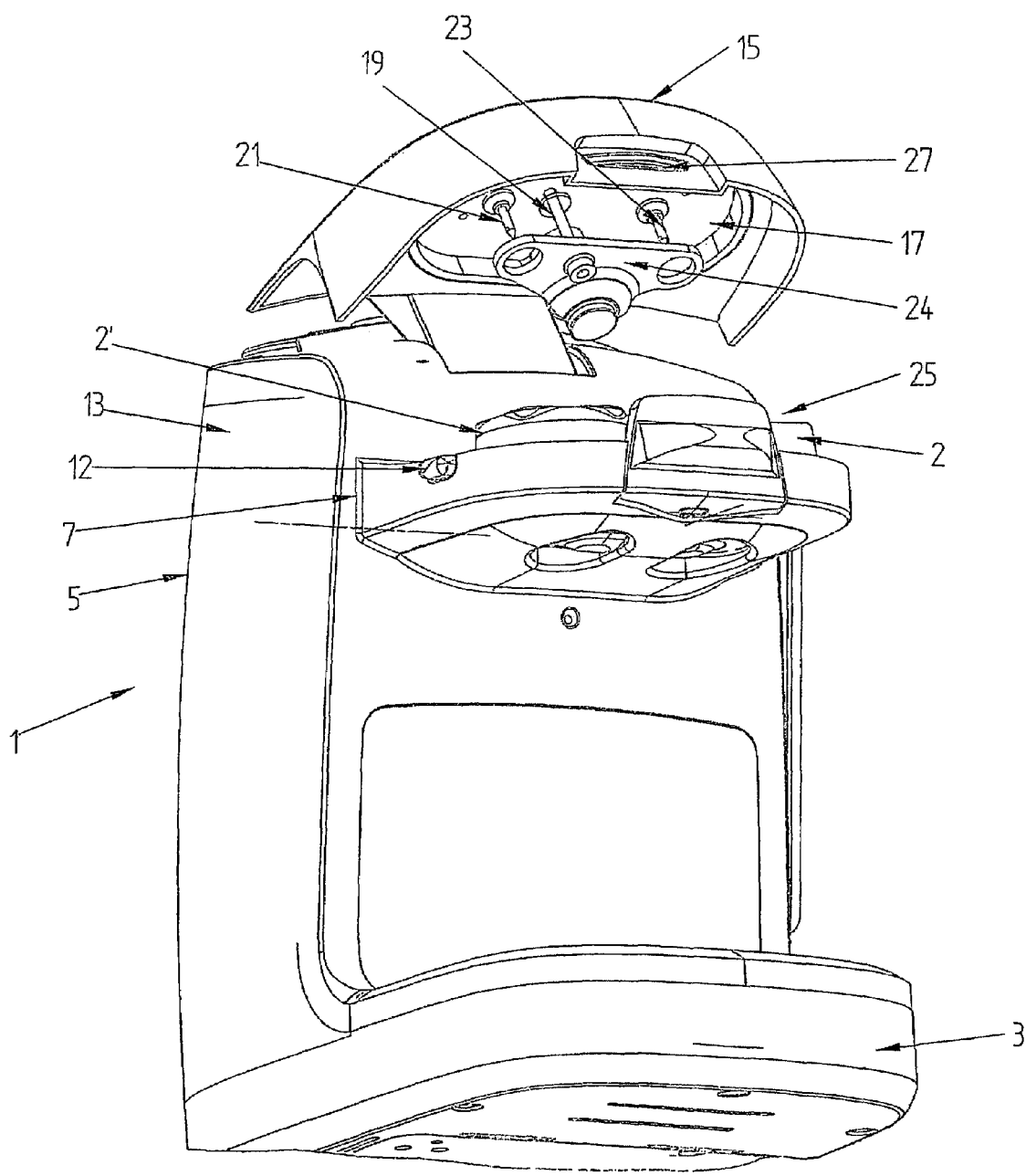

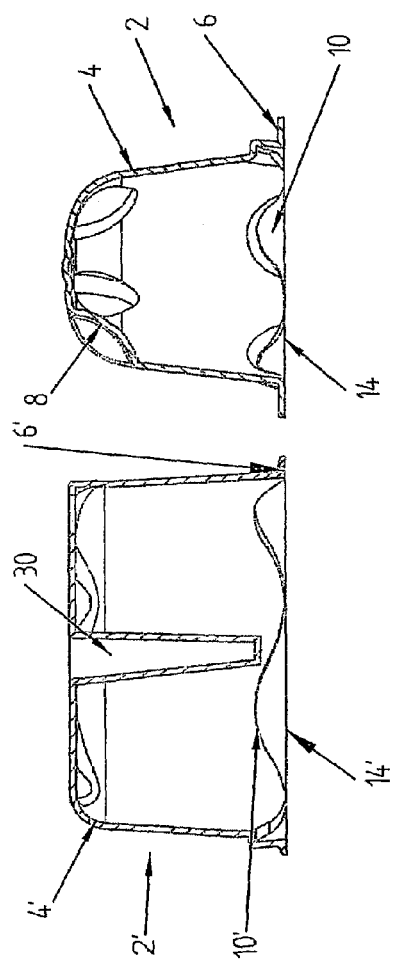
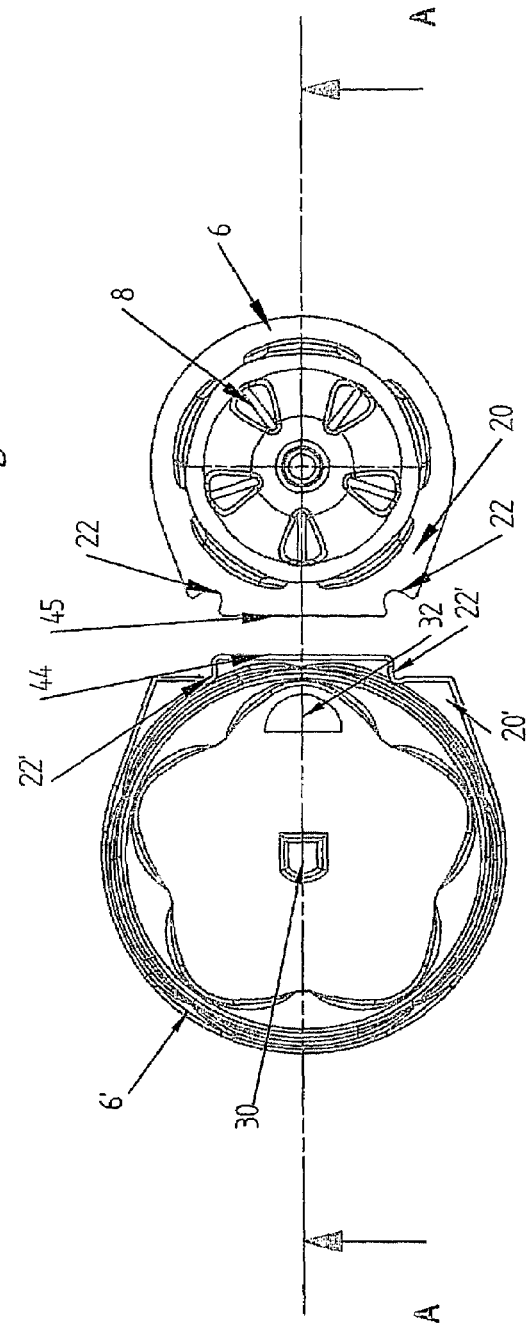
Fig. 3b
Fig. 3a
Fig. 4b
Fig. 4a
A-A

CARTRIDGE-OPERATED COFFEE-MACHINE

The present invention relates to an apparatus for preparation of hot beverages starting from prepackaged cartridges of soluble or percolation foodstuffs, such as ground coffee, tea or soluble powders.

An apparatus for preparation and distribution of hot beverages generally comprises a cold water tank, an electric pump, a unit forming a boiler and an infusion head that receives the cartridges in order to inject therein hot water coming from said boiler, the beverage obtained being then directed towards a collecting container.

An apparatus of this type is described in the U.S. Pat. No. 3,295,998, which functions with disposable prepackaged coffee cartridges, or pellets, of single size. Such a cartridge, which is initially hermetically closed while being made of a metal sheet, is disposed in the distribution head where its upper and lower walls are pierced by tapered points. A first series of points allow the infusion water to enter at the upper part, whereas a second series of points perforate outflow openings at the lower part of the cartridge. The problem encountered with such an apparatus is that, while being complex, it is limited to use with capsules of a single size, for example with ground coffee capsules. If one wants to obtain another type of beverage, for example a beverage containing a soluble product, it would then be necessary to use a second machine adapted to operate with this new size of capsule, this second having generally larger dimensions than that of the ground coffee, for the same quantity of beverage obtained in the collecting container.

In order to mitigate this problem, document EP 0 125 215 describes a distribution group for a machine distributing hot beverages able to function with prepackaged plastic cartridges of two different sizes. The infusion chamber of the infusion group comprises a housing cylinder for receiving, in its upper part, a cartridge of small size that is supported at its seat by a rod internal to said cylinder. At the interior of the housing cylinder is arranged a counter-cylinder able to receive, with the housing cylinder, a cartridge of large size. Such an infusion chamber allows, certainly, the use of two types of cartridges, a small one containing a percolation product and a larger one containing a soluble product, but under the particular condition that these cartridges have the same exterior diameter of the side wall of their receptacle, as well as the same diameter of the seating flange at the front part of the infusion chamber, thus reference diameters common to cartridges of different formats. Moreover, this construction requires the presence of an internal maintenance rod for a cartridge of small size.

One in addition knows the document EP 1 208 782, which describes a percolation device for a coffee-maker functioning with prepackaged capsules of different formats. The machine comprises a percolation chamber provided with a percolation head mounted to slide across an opening provided in the upper part of the chamber. The percolation head presents at the inside a bell-shaped hollow having dimensions corresponding to those of a capsule of small size. During the use of a capsule of large size, the top of the capsule pushes the percolation head upwards. The relative position of the percolation head with respect to the chamber is thus caused to vary according to the dimension of the cartridge. A stop body actuated by a cam is provided to ensure blocking in position of the percolation head according to the size of the capsule used. The disadvantage of such a percolation device consists in that it is composed of many moving bodies and presents by this fact a complex construction. In addition, for problems of sealing, the positioning of capsules of different sizes inside the chamber must be done according to the same diameter of the shoulder for all of the capsules, which limits by this fact the use of the machine to capsules having the same seat or shoulder dimension.

The goal of this invention is to remedy at least partly the above mentioned disadvantages and to optimize the fitting of a plurality of cartridges of different sizes in an injection head of a coffee-maker to make this machine as versatile as possible while reducing its size.

An additional goal of the invention is a coffee-maker able to function either with two identical cartridges, or with two cartridges of different sizes simultaneously.

Another goal of the invention is a coffee-maker able to function with cartridges of different sizes, while allowing a precise fitting of a cartridge with respect to housings provided for this purpose in the infusion head.

Another goal of the invention is a coffee-maker intended for operation with cartridges of different sizes which is of a simplified construction, easy to manufacture commercially and in an economical manner, while being easy to use and reliable in operation.

These goals are reached with a coffee maker able to function with cartridges, comprising means for supplying hot water to an infusion head able to receive at least two cartridges of different diameters each having at least one flat seating surface, means for placing said means for supplying in communication with the product contained within the cartridges in order to obtain a beverage, as well as means permitting said beverage leaving the cartridge to be directed towards a beverage collecting container, where said infusion head has a support having at least one hollow forming a housing for at least two cartridges of different diameters, by the fact that said hollow has the same peripheral annular seat common to several seating flange diameters of different cartridges, one or more parts of the external edge of said peripheral seat the hollow forming a vertical wall for common indexing of said cartridges.

By infusion head one generally understands the part of the machine where the infusion occurs or the part that, on the one hand, supports the infusion or percolation product, and on the other hand, ensures the arrival of hot water under pressure in contact with the infusion or percolation product.

By seating surface of a cartridge one understands a surface, generally flat, with which the cartridge bears on a wall forming a support of a housing provided for this purpose inside the infusion head. The seating surface generally borders the receptacle containing the product to be infused and has, by this fact, a peripheral dimension greater than that of the receptacle. This seating surface should be sufficiently rigid and have sufficiently large dimensions to allow a cartridge to be held in place without a deformation of the cartridge or a displacement of the latter occurring under the force of a perforation body or of infusion water under pressure. This especially if the point of perforation is shifted with respect to the seating plane, in particular if the cartridge is placed with its seat inside the hollow, the receptacle containing the product to be infused being oriented toward the top in the direction of the injection body.

In the framework of the cartridges of the invention, this seating surface is in the form of a peripheral flange bordering a cylindrical receptacle or of a truncated cone in its lower part. The dimensions of this flange can be about 3 to 7 mm for an external diameter of approximately 70 to 50 mm. Such a cartridge is intended for operation at low pressure, the injection pressure being able to be approximately 0.5 to 1 bar.

By seating diameter of a cartridge, one understands the external diameter of its seating surface, in the case where the seating surface has a circular form; or the diameter of the circle in which is inscribed the external contour, even the major part of the external contour of a seating surface for a cartridge of any form.

By the same peripheral annular seat common to several cartridges of different seating diameters, one understands a wall of annular form of the hollow provided to receive at least two cartridges presenting seating surfaces of different seat diameters or corresponding external diameters. One understands more particularly that cartridges of different sizes can be installed inside the peripheral annular surface of the hollow. The latter thus has sufficiently large dimensions to be able to receive cartridges having different seat diameters, or in a manner such that the seat diameters of all of the cartridges can be inscribed inside said peripheral annular seat. Several cartridges of different seat diameters can be thus supported by the same flat wall of the hollow, while being positioned at the same height with respect to the injection and evacuation means, which simplifies in a notable manner construction of such a hollow.

One could, certainly, have considered a seat that is circular or presenting a closed contour of any form, but one prefers an annular form, i.e., presenting an opening within its circumference to thus create a passage for flow of infused beverage through the hollow of the support for the cartridges. Thus, the external dimension (for example its diameter) of such a peripheral seat corresponds to the maximum external diameter of a large or wide cartridge and the interior dimension (for example its diameter) is slightly greater than the external diameter of a cartridge of small size, a plurality of cartridges of intermediate seat diameters, ranging between said maximum diameter and said minimum diameter, also being able to be received inside such a hollow and oriented by the vertical indexing wall.

By peripheral annular seat of which part of the external edge forms a vertical indexing wall common to several different cartridges, one understands that a part of the vertical wall bordering at the outside the peripheral seat of the hollow has a reference dimension common to at least two cartridges which have different seat dimensions. Thus, said seat with a form and dimensions able to accommodate either a cartridge of broad format or cartridges of narrower formats, where the cartridges, broad or narrow, are inscribed in the interior of the peripheral seat contour of the hollow, while being oriented with respect to the vertical indexing wall, flat or in the arc of circle, with which they come in contact. Such a cartridge, oriented with respect to the indexing wall, can take only one possible position, which confers thereon a sure and stable seat, without the user being able to be mistaken about the position during the introduction of cartridges of different formats into said hollow.

By vertical wall one understands a wall essentially perpendicular to the plane of a horizontal seat of the hollow, without excluding the possibility that this vertical wall has a small angle of inclination, which would facilitate the introduction of a cartridge into a hollow that is then flared out. This vertical wall can be a wall bordering the seat of the hollow or a rib located in the plane of the seat, perpendicular to the latter.

Thus, the same hollow becomes multi-purpose, a cartridge being able to be inscribed inside the peripheral annular seat of the hollow and oriented with respect to the vertical wall, several cartridges of different sizes having thus a good positioning within the hollow and also with respect to the perforation and injection bodies present in the infusion head. Such a coffee-maker can be used with at least two product cartridges of different dimensions. In the case of a circular seat, such a hollow can accommodate at least two cartridges of different external diameters at the level of their base or support flange.

With the same hollow one can thus obtain several types of beverages and/or different quantities of beverages. For example, a cartridge of large or broad format can contain a soluble product, whereas a cartridge of small or narrow format can contain an infusion product. In another case, a cartridge of broad format can contain a larger quantity of the same infusion product than a cartridge of narrow format, this also requiring a more significant quantity of infusion water. In this case, with only two cartridges of different formats one can vary the quantity of beverage obtained.

Thus, by using a single support for reception of distinct cartridges, one reduces the size of the infusion head, while making it possible to vary the type and the quantities of beverages prepared. Such a solution presents an ease of construction, an ease of use and a remarkable sturdiness.

In a preferred embodiment of the invention, a cartridge is indexed with respect to one of the vertical side walls of said hollow.

By side wall one understands a wall along the edge of the hollow in the direction of its longitudinal axis. In an alternative, one can also envision a transverse vertical wall, i.e., along the edge of the hollow, but in a direction perpendicular to the longitudinal axis. This side wall common to several cartridges of different seat diameters can be a flat or circular arc face of a vertical end wall of the hollow. Thus, the cartridges used with such a hollow each present a dimension known as a common side reference, comparable with that of the indexing wall, dimension which serves for orientation at the time of their installation inside the hollow. It is understood that, in this arrangement, the two cartridges are not coaxial, but offset laterally to take support with a side on the indexing wall. Abutments could be envisioned to avoid displacements in translation in the opposite longitudinal direction of a cartridge of narrow format inside the hollow. This ensures the maintenance in place of the cartridges and their good positioning with respect to the perforation and water injection bodies.

In another embodiment of the invention, one cartridge is indexed with respect to at least two vertical walls of said hollow facing each other.

In this case, the cartridges can be disposed in a coaxial manner with respect to one another inside the hollow, with the result that a second opposite common side dimension can be used as an abutment. This dimension can be transverse or longitudinal or a combination of both. If necessary, abutments can also be provided to avoid a displacement in rotation of a cartridge of small size with respect to a larger hollow and to thus obtain a stable positioning of a cartridge inside a multi-purpose hollow. The cartridges used with such a multi-purpose hollow must also present at least one common transverse reference.

Some examples can be imagined: a cartridge of narrow format, called a standard cartridge, of transverse circular cross section, one could associate a cartridge of broad format, or called special, of elliptic or circular, even square transverse cross section or in the shape of any other regular polygon, in which one can inscribe the standard cartridge, provided that the transverse dimension of the latter, for example the width, corresponds to the diameter of the standard cartridge. In another example, a standard cartridge of square or polygonal section is associated with a special circular cartridge of diameter corresponding to the largest dimension of the standard cartridge. In other examples, a standard cartridge can have a regular form or an arbitrary form, but having at least one dimension in common with that of the special cartridge, which has a regular form or any form allowing the first be inscribed in the second, while being oriented along its common transverse or side dimension.

Advantageously, said hollow comprises at least one rib for guiding said cartridges in the longitudinal and/or transverse direction.

This allows a simple indexing, for example by using a side wall, while effectively blocking any possible displacement of a cartridge with respect to the hollow. Said guide ribs cooperate preferably with the periphery of the seat of a cartridge.

Usefully, said hollow comprises an opening bordered by a centering wall for a cartridge of broad format, the lower periphery of said wall being connected to a horizontal peripheral seat whose internal diameter forms a support for a cartridge of narrow format, the circular internal edge of this peripheral seat being connected with a collecting zone in the form of a downwardly directed funnel.

This makes it possible to position each cartridge correctly in its housing and to direct the beverage obtained towards a collecting container, while optimizing construction. As an example, a support comprising such a hollow can be made of a plastic by a technique of injection molding.

Advantageously, said hollow is intended to cooperate with at least two injection needles of different heights.

Thus, each type of cartridge can profit from an injection to an optimal depth according to the type of product which it contains. Thus, it is for example preferable to inject water only in the upper part of a ground coffee cartridge, so that water has time to infuse the grounds while descending towards the exit from the cartridge, whereas it is better to inject water in the lower part of a cartridge containing a soluble product in order to optimize the mixing of the latter with the injected water. In addition, by using different needles connected to independently controlled means for supplying infusion water, one can also vary the quantity of infusion water delivered into a specific cartridge.

Preferably, said injection needles are offset radially with respect to the axis of said hollow, the longest needle being the furthest from the center.

This makes it possible to prevent that the longest needle unnecessarily perforates a cartridge of small size which is, itself, already perforated by the short needle. In addition, the longest needle is more particularly intended for the injection of water in the lower and peripheral part of a cartridge of soluble product, generally of larger dimensions.

Advantageously, said infusion head has two side-by-side hollows in a common support.

This makes it possible to prepare either two identical beverages simultaneously in the case where two identical cartridges would be installed in the two hollows, for example two coffee cups; or a beverage combined by using two different cartridges, for example a milk cartridge and a coffee cartridge to obtain coffee with milk.

Preferably, said two hollows each have one peripheral annular seat presenting at least one common vertical indexing wall, the two seats being located at the same level.

Thus, one can place two identical cartridges inside the hollows, the two seats being located at the same level making possible their use with two identical injection bodies, located at the same height.

Advantageously, said two hollows each present a vertical indexing wall, the two walls being located at one side and the other of a partition separating said hollows.

Such an arrangement makes it possible to optimize construction and to reduce the size of an infusion head with two hollows.

Usefully, said support is removably mounted in the infusion head.

Such a removable support facilitates the extraction of the cartridges at the end of the beverage preparation cycle, the cartridges then being able to be evacuated to outside the machine by emptying the support. In addition, such a support is subject to soiling, by being often in contact with the beverage; thus by making it removable, one facilitates cleaning.

Figure 2A:
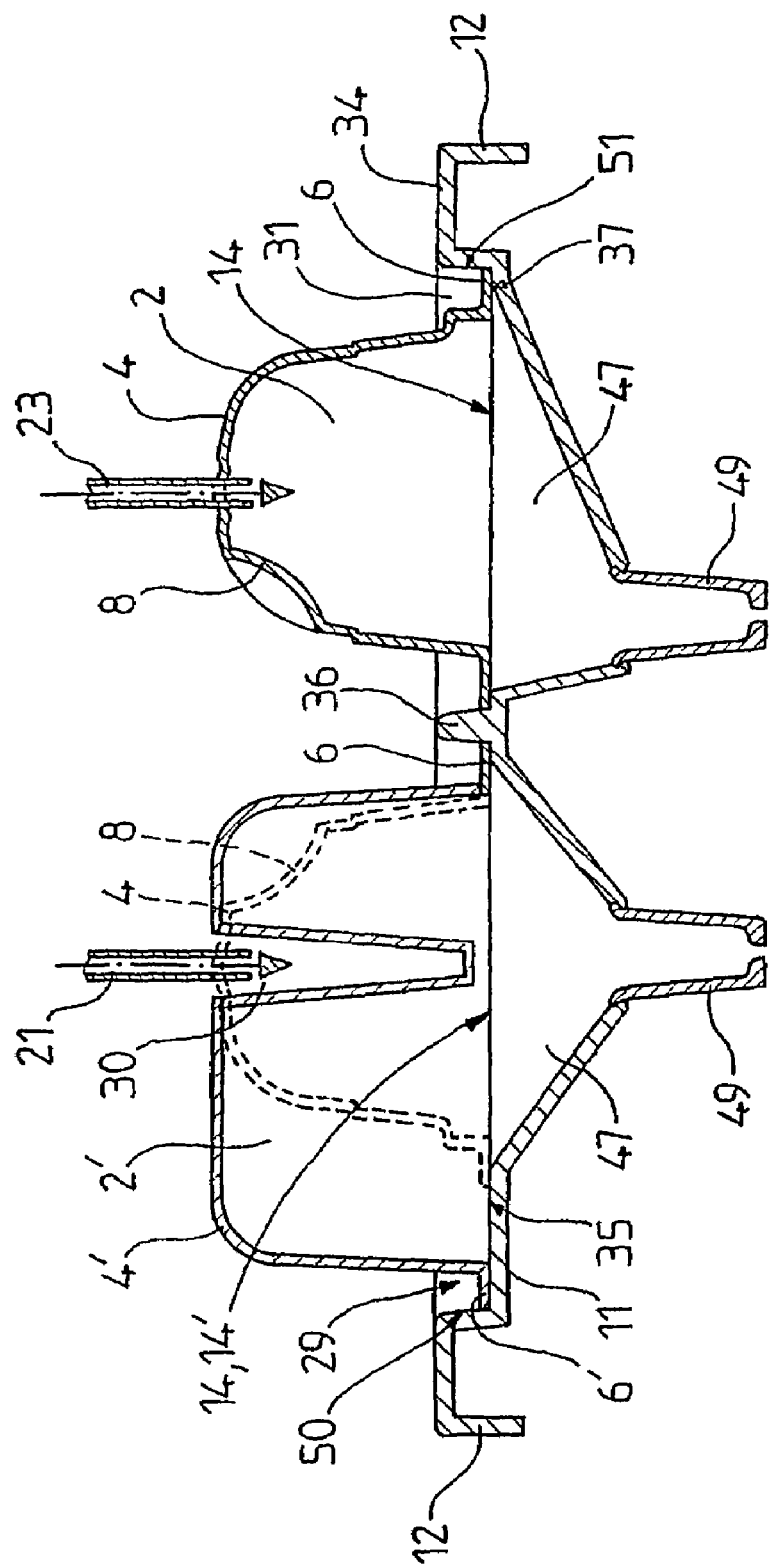
Figure 2B:
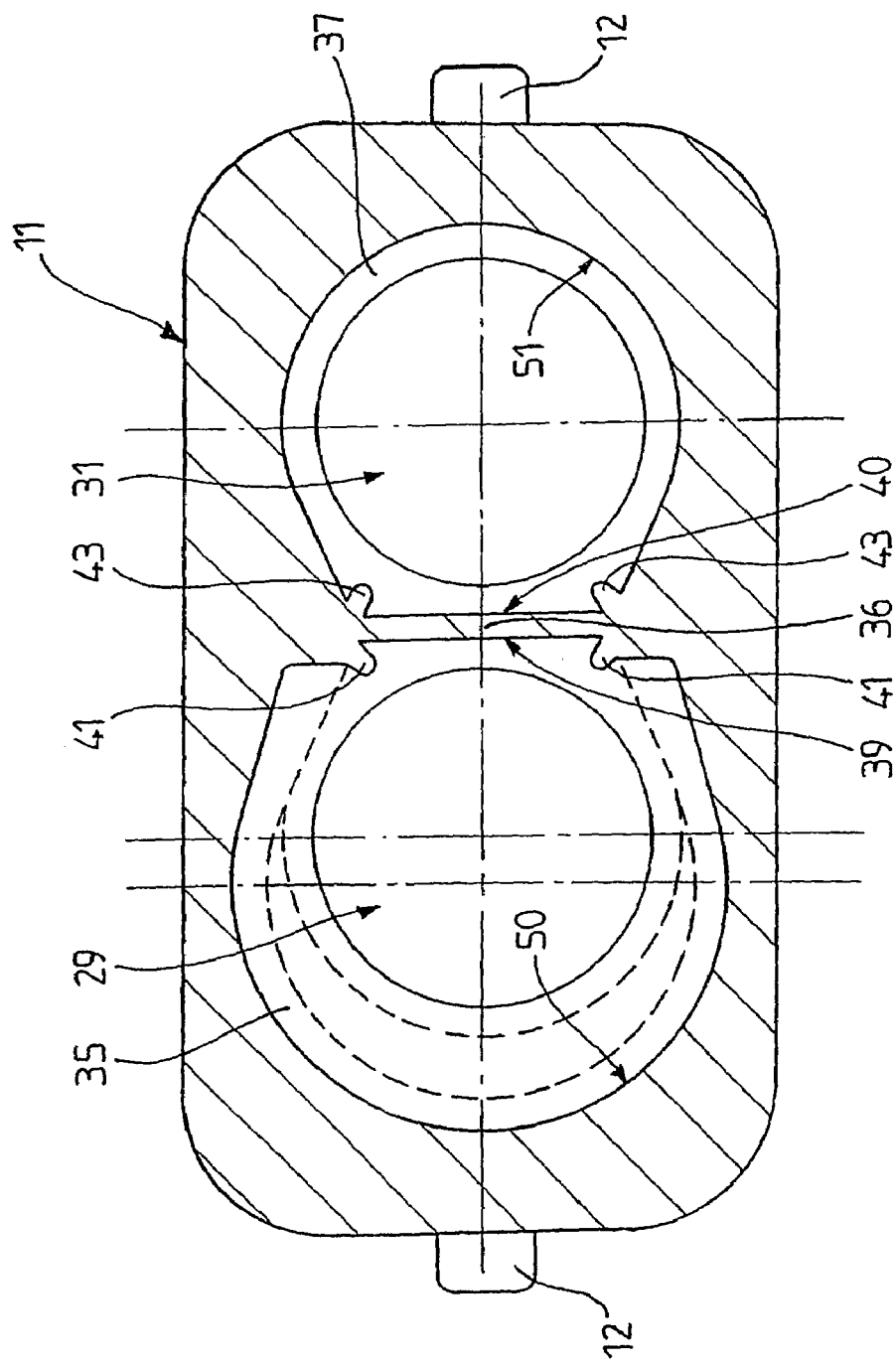
Figure 5:
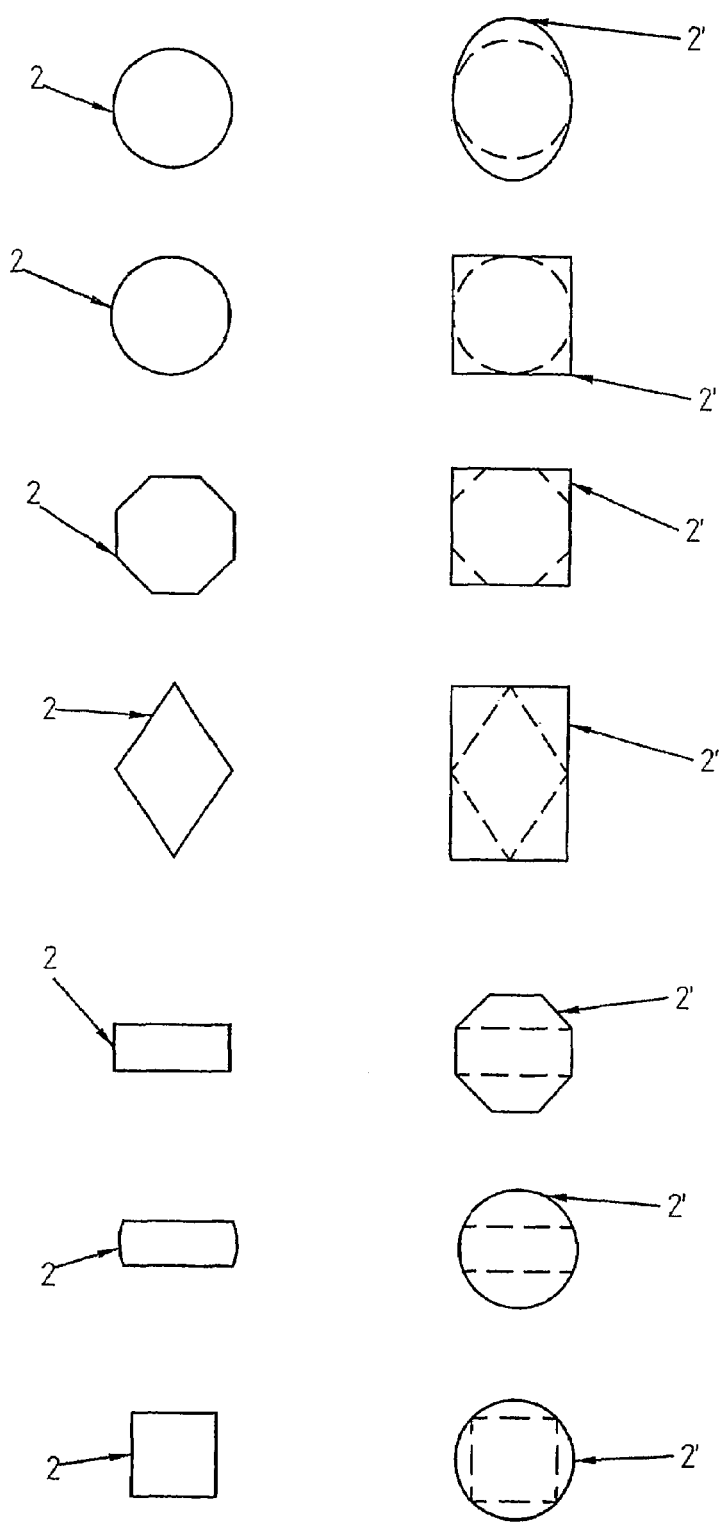

The invention will be better understood from a study of the embodiments taken on a nonlimiting basis and illustrated in the annexed figures in which:

FIG. 1 is a general view in perspective of a coffee-maker according to the invention, in its open position;

FIG. 2*a* is a vertical axial cross-section of a support for the cartridges, with two cartridges represented side-by-side;

FIG. 2*b* is a transverse cross-section, in a plane passing through the seat of the cartridges, of a support for the cartridges, with two cartridges represented side-by-side;

FIGS. 3*a* and 3*b* represent a top view and an axial cross-section of a cartridge of small size;

FIGS. 4*a* and 4*b* represent a top view and an axial cross-section of a cartridge of large size;

FIG. 5 illustrates in a diagrammatic manner various combinations of forms of sections of cartridges according to an alternative of the invention.

As illustrated in FIG. 1, case 1 of the coffee-maker comprises a lower horizontal base 3 completed by a rear vertical upright 5. A horizontal tray 7 is fixed starting, from the rear upright at a height allowing the subjacent positioning of a container, such as cup, tumbler or coffeepot. The upper face of the frontal end of tray 7 presents a hollow housing in which a removable support 11 for two side-by-side cartridges 2, 2' is installed.

The anterior end of tray 7 is completed by two side uprights 13 supporting in rotation a jaw 15 whose frontal end has a cross-piece constituting a mounting base 17 for a plurality of needles 19, 21 and 23 directed downwardly toward the cartridges.

Needles 19, 21, 23 are mounted by the intermediary of a needle-carrying plate to mounting base 17, their ends passing through openings provided in a maintenance plate 24 which comes to bear on the upper part of cartridges 2, 2'. Needles 19, 21, 23 are hollow and present, at one of their ends supported by mounting base 17, an end for connection to a pipe for supplying infusion water, whereas the opposite end presents a tapered point, an opening for injecting water into the cartridge being formed a little above said tapered point. Thus, one notes a longer needle 19 coming in correspondence with a hollow 29 for a cartridge 2' of broad format or cartridge known as special, whereas shorter needles 21, 23 are provided to come in correspondence with each of hollows 29, 31 able to receive a cartridge 2 of narrow format or cartridge known as standard. Needles 19, 21, 23 are arranged in the same vertical median plane of support 11, the needles 21 and 23 being positioned at the center of hollows 29 and 31, whereas longer needle 19 is shifted towards the periphery of hollow 29. Needles 21, 23 penetrate to a shallow depth at the center of a standard cartridge 2 containing for example ground coffee or another infusion product and inject therein hot water under pressure, water which, while descending, flows through the entire volume of the cartridge. Needle 19 is inserted more deeply inside a special cartridge 2' of soluble product, close to the periphery of the latter so that the water jet under pressure delivered tangentially to the internal wall of the cartridge creates a swirl that stirs the mixture well.

In addition, a mechanism 25 for locking jaw 15 in the lowered position comprises a hook mounted in rotation at the frontal end of tray 7 and coming to engage in a corresponding notch 27 formed in the end of jaw 15.

Within the framework of the invention, a cartridge 2, 2' is presented as a receptacle in the shape of an inverted cup. The lower face of this receptacle can be flat or can present a bottom in the form of a funnel, a radial flange being provided on the circumference of the receptacle at the level of its lower face.

Such as is visible in FIGS. 3*a* and 3*b*, a standard cartridge 2 comprises a thermoformed envelope 4 forming a side and upper wall, prolonged at the lower part by a radial flange 6 on its circumference. The side wall has the shape of a conic frustum presenting, at the upper part, several rigidifying notches 8. A piercing zone, in the shape of an inverted shallow dome, is provided at the center of the upper part of cartridge 2 in order to facilitate the orientation of an injection needle for the perforation of envelope 4. At the lower part, standard cartridge 2 presents several sinusoidal ribs 10 conferring a certain stiffness on the base of the side wall, bordering radial flange 6. A sieve or filter 14 is cemented or welded onto the lower face of radial flange 6 while thus providing, with envelope 4, a volume for reception of a product to be infused, such as ground coffee. Such a product occupies the major part of volume, the remainder being intended for reception of the infusion water.

In a preferred embodiment of the invention, a standard cartridge 2 is made of a sheet of food grade plastic, for example of the polypropylene or polyethylene type having a thickness of approximately 1.3 mm. The diameter of the seat of the cartridge is approximately 40 mm, the side wall having an angle of inclination of around 7° with respect to the vertical. The diameter of the radial flange 6 is approximately 50 mm, which results in a radial edge of approximately 5 mm on the circumference. The height of a cartridge 2 is approximately 36 mm. Filter 14 can be paper, of the nonwoven, perforated type.

In order to shelter the product to be infused from contact with the air, which could cause a premature oxidation of this product, a sealing cover, made of a plastic or aluminium material, is also cemented on the lower face of flange 6, outside the filter 14. This sealing cover will be torn by the user before the introduction of cartridge 2 into the support provided for this purpose in the machine, a gripping strip being able to be provided for this purpose.

Such as better seen in FIG. 3*a*, radial flange 6 is prolonged on one side by a lengthened edge 20 ending in a straight side edge 45. Two notches 22 are delimited on edge 20, at one side and the other of its axis of symmetry. Notches 22 have the role of positioning cartridge 2 properly in its support provided for this purpose in the machine, as will be explained hereafter.

A special cartridge 2' is shown in FIGS. 4*a* and 4*b*. This cartridge generally has the same components as standard cartridge 2, shown in FIGS. 3*a* and 3*b*, and carrying the same reference numerals followed by the character "'". Thus, special cartridge 2' comprises a thermoformed envelope 4' forming a side and upper wall, prolonged, at the lower part, by a radial flange 6' on its circumference. The side wall can have a cylindrical form presenting, in the lower part, several sinusoidal ribs 10' conferring stiffness at the base of the side wall, bordering radial flange 6'. A sieve or filter 14' is cemented or welded onto the lower face of radial flange 6' while thus providing, with envelope 4', a volume for reception of a product to be dissolved, such dried milk, freeze-dried coffee, a mixture of both, chocolate in powder form, etc. In this case, as in that of standard cartridge 2, a sealing cover is also cemented on the lower face of flange 6', at the outside of filter 14', this cover, provided with a gripping strip, being also torn by the user before the introduction of cartridge 2' into the support provided for this purpose in the machine.

As provided for standard cartridge 2 and as is better seen in FIG. 4*a*, radial flange 6' of special cartridge 2' is also prolonged on one side by an edge 20' ending in a straight side edge 44 and having two notches 22' cut at one side and the other of its axis of symmetry for better orienting cartridge 2' in its support provided for this purpose in the machine.

In a preferred embodiment of the invention, a special cartridge 2' is made of a sheet of food grade plastic, for example of the polypropylene or polyethylene type having a thickness from approximately 1.3 mm. The diameter of the cylindrical part of envelope 4' is approximately 58 mm, the diameter of radial flange 6 is approximately 66 mm, which results in a radial edge of approximately 4 mm on the circumference. Such a cartridge 2' has, preferably, the same height as a standard cartridge 2, for example 36 mm.

At the center of the upper face of cartridge 2', envelope 4' forms a well 30 allowing short injection needle 21 to descend without perforating cartridge 2'. On the same upper face, but this time shifted towards the periphery, envelope 4' forms a hollow 32 for guidance of longer needle 19 which descends to the interior of cartridge 2'.

In addition, support 11 for cartridges 2, 2' is removably mounted in the hollow housing of tray 7 and it has to this end two gripping handles 12 which come to settle in corresponding hollows in said housing of tray 7. Gripping handles 12 project laterally in order to facilitate gripping of support 11 by the user of the machine.

According to the invention, support 11 forms two traversing vertical hollows 29 and 31 for reception and maintenance of product cartridges 2 and 2'. As better seen in FIG. 2*b*, support 11 for the cartridges has an oblong form, allowing the arrangement of two cartridges side-by-side in two hollows 29 and 31 along the same longitudinal axis, the two hollows being separated by a central partition 36.

In FIG. 2*a* there is shown two cartridges 2' and 2 side-by-side in a common support 11, one cartridge 2 being represented in dotted lines superimposed on the cartridge 2' in order to facilitate understanding of an alternative using two identical side-by-side cartridges 2. Thus, it is noted that flange 6 of a standard cartridge 2 comes to bear on a peripheral annular seat 37 of hollow 31 while being inserted with its side edge 45 toward partition 36, whereas flange 6' of a special cartridge 2' comes to bear on a peripheral annular seat 35 of hollow 29, with its side edge 44 also directed toward partition 36.

More particularly according to the invention, hollow 29 has an annular peripheral seat 35 with an external diameter corresponding to that of flange 6' of special cartridge 2' and, at the side of partition 36, a vertical side wall 39 for indexing of the cartridges. The internal diameter of peripheral annular seat 35 has a dimension lower than that of flange 6 of a cartridge 2 thus forming a support for a cartridge 2 and also for a cartridge 2' (FIG. 2*a*) placed in the hollow for infusion.

The two cartridges 2, 2' each present a side edge 44, respectively 45, which comes opposite to vertical side wall 40 of partition 36.

As is better seen in FIG. 2a, hollow 29 has an opening bordered by a centering wall 50 for special cartridge 2', centering wall 50 having an internal diameter equal to or slightly greater than the external diameter of flange 6' of cartridge 2'. The lower periphery of this wall is connected to a peripheral annular seat 35. The circular internal edge of this seat is connected with a collecting zone 47 in the shape of a downwardly directed funnel and equipped with an outlet opening for the beverage at the end of an outlet cone 49 also directed downwardly.

Neighboring hollow 31 has, as for it, a peripheral annular seat 37 of external diameter corresponding to that of flange 6 of a standard cartridge 2 and, at the side of partition 36, a vertical side wall 40 for indexing of a standard cartridge 2. Lower annular peripheral seat 37 is at the same height level as peripheral annular seat 35 of the neighboring hollow 29, with the result that two different cartridges 2 and 2' or two identical cartridges 2 arranged side-by-side, one in hollow 29 and the other in hollow 31 are at the same level. Owing to the fact that the two side-by-side cartridges are at the same level, the arrangement and the positioning of the perforation and water injection bodies is facilitated, as well as that of maintenance plate 24. As in the preceding case, hollow 31 has an opening bordered by a centering wall 51 for flange 6 of a standard cartridge 2. This centering wall 51 can be, like the preceding one, vertical or oblique. The lower periphery of this wall is connected to a peripheral annular seat 37 provided to support flange 6 of standard cartridge 2. The circular internal edge of this lower peripheral seat 37 is itself also connected with a collecting zone 47 in the shape of a funnel directed downwardly and equipped with an outlet opening for the beverage at the end of an outlet cone 49 also directed downwardly.

In an alternative, hollow 31 can have, like the preceding one, a peripheral annular seat 37 able to receive two cartridges 2, 2' of different formats.

The side surface of each hollow is slightly flared toward the top, of the order of 5 to 10% in order to facilitate the installation of the cartridges 2, 2' in their respective hollow 29, 31 inside support 11, with the flange directed downwardly.

On the frontal face of each of the annular peripheral seats 35 and 37, at the side of partition 36, there are two upwardly extending ribs 41, respectively 43 arranged obliquely, at one side and the other of the longitudinal axis of support 11, thus allowing a good orientation, in dovetail, of cartridges 2, 2' and their maintenance in position close to partition 36. Each rib 41, 43 extends in height between the surface of a peripheral annular seat 35, 37 and the upper face 34 of support 11. When introducing them inside the hollows, the cartridges are inserted with their notches 22, respectively 22' on ribs 41, respectively 43. This ensures a correct positioning of cartridges 2, 2' with respect to support 11, respectively with respect to the position of injection needles 19, 21, 23, while preventing a longitudinal displacement of cartridges 2, 2'.

In operation, the user starts by putting a standard cartridge 2 in hollow 31 and a special cartridge 2' in hollow 31, if he wishes to make coffee with milk, or two identical cartridges 2 in each hollow 29, 31 if he wants to make two black coffees at the same time. Once the cartridges are installed in their respective housings, the user lowers jaw 15 until the hook of the locking mechanism 25 engages in a notch 27 in the end of jaw 15. At the same time as the descent of jaw 15 towards its locked position, needles 19, 21, 23 perforate cartridges 2, 2' and take their place inside the latter.

In this position jaw 15 is locked and the coffee-maker is ready to carry out an infusion cycle. The user turns the coffee-maker on while acting on an on/off control knob. Power is then supplied to the heating element and the boiler of the coffee-maker heats up quickly. When the adjustment thermostat of the heater triggers, the infusion water, coming from a cold water tank supported by case 1 being sent by a pump of the same case through the boiler, arrives inside cartridges 2, respectively 2'. The infusion water is then injected into cartridges 2, 2' by two of the infusion needles 19, 21, 23. The infused beverage flows out then via outlet cones 49 into one or two container(s) located in correspondence with outlet cones 49.

Once the infusion cycle is finished, the user unlocks jaw 15 which opens by being pushed by a return spring. The user can thus reach the support 11 which he withdraws by taking it by handles 12 to empty it outside the machine. Once this support 11 is positioned back in housing 9 of horizontal tray 7, another cycle for producing one or more beverages can start again.

Other alternatives of realization of the invention can be envisioned without departing from the framework of its claims.

Thus, one can envision a support having two identical hollows, each one allowing use with the same number of cartridges of different sizes. Each hollow could have several seating surfaces for the base of the cartridges, the larger the number of seats, the greater are the possibilities of use with a large number of cartridges of different formats. Such hollows allow use with any type of cartridge, without taking account of its external form or of the value of its diameter, provided that this cartridge has a flat seating surface intended to come to bear on the seating surface of a hollow and at least one dimension for indexing with respect to the hollow.

FIG. 5 illustrates, in a diagrammatic way, some possible combinations according to some alternatives of the invention. FIGS. 2a and 2b illustrate various possible combinations of cross sections between standard cartridge 2 (represented in solid lines on the left-hand part of FIG. 5 and in dotted lines on the right-hand part of the same figure) and special cartridge 2' (represented in solid lines in the left-hand part of FIG. 5). It is understood, in these alternatives, that the contour of the peripheral seat of the multi-purpose hollow supporting the cartridges corresponds to the seating contour of the larger cartridge or special cartridge 2'. Thus, for example, the standard cartridge 2 having a seat of circular cross section can be associated with a special cartridge (one understands inscribed inside the latter) having a seat whose cross section is elliptical, or square, or even circular inscribed in a triangular, or octagonal cross section or any other regular polygon where the width of the seat of cartridge 2' is equal to the diameter of the seat of cartridge 2; or a standard cartridge 2 of octagonal cross section can be associated with a special cartridge 2' of square cross section having a seat of the same width; or a standard cartridge 2 of rhombic cross section can be associated with a rectangular special cartridge 2' having a seat of the same width and length as that of the standard cartridge; or a standard cartridge 2 whose seat has a rectangular cross section and having a predetermined width is associated with a special cartridge 2' of octagonal form having a seat of the same width as the first; or a cartridge in the form of sector of a circle of preestablished diameter is associated with a circular special cartridge 2' of the same diameter as the preceding one; or even a standard cartridge of square form with a given diagonal is associated with a circular special cartridge 2' of diameter equal to the diagonal of the standard cartridge 2; or a standard cartridge having the form of a regular polygon inscribed in a circle representing the special cartridge 2', the diameter of this circle being equal to the largest dimension of the standard cartridge; or finally, a standard cartridge having a regular form or an arbitrary form, but having at least one dimension of the same order of magnitude as the special cartridge (having a regular form or an arbitrary form) which allows the first to be inscribed in the second.

The invention claimed is:

1. Coffee maker able to function with cartridges containing a beverage-producing product, comprising means for supplying hot water to an infusion head able to receive at least two cartridges (2,2') of different diameters each having at least one flat seating surface, means for placing said means for supplying in communication with the product contained within the cartridges in order to obtain a beverage, as well as means permitting said beverage leaving the cartridge to be directed towards a beverage collecting container, where said infusion head has a support (11) having at least one hollow (29) forming a housing for at least two cartridges (2,2') of different diameters, characterized in that said hollow (29) has a peripheral annular seat (35) common to several seating flange (6,6') diameters of different cartridges, one or more parts of the external edge of said peripheral seat (35) forming a vertical wall for common indexing of said cartridges (2,2'), characterized in that one cartridge is indexed with respect to one of the vertical side walls (39) of said hollow.

2. Coffee maker according to claim 1, characterized in that said support (11) is removably mounted in the infusion head.

3. Coffee maker according to claim 1, characterized in that one cartridge is indexed with respect to at least two vertical walls of said hollow facing each other.

4. Coffee maker according to claim 1, characterized in that said hollow (29) comprises at least one rib (41) for guiding said cartridges (2,2') in the longitudinal and/or transverse direction.

5. Coffee maker able to function with cartridges containing a beverage-producing product, comprising means for supplying hot water to an infusion head able to receive at least two cartridges (2,2') of different diameters each having at least one flat seating surface, means for placing said means for supplying in communication with the product contained within the cartridges in order to obtain a beverage, as well as means permitting said beverage leaving the cartridge to be directed towards a beverage collecting container, where said infusion head has a support (11) having at least one hollow (29) forming a housing for at least two cartridges (2,2') of different diameters, characterized in that said hollow (29) has a peripheral annular seat (35) common to several seating flange (6,6') diameters of different cartridges, one or more parts of the external edge of said peripheral seat (35) forming a vertical wall for common indexing of said cartridges (2,2'), characterized in that said hollow comprises an opening bordered by a centering wall (50) for a cartridge (2') of broad format, the lower periphery of said wall being connected to a horizontal peripheral seat (35) whose internal diameter forms a support for a cartridge (2) of narrow format, the circular internal edge of this peripheral seat (35) being connected with a collecting zone (47) in the form of a downwardly directed funnel.

6. Coffee maker able to function with cartridges containing a beverage-producing product, comprising means for supplying hot water to an infusion head able to receive at least two cartridges (2,2') of different diameters each having at least one flat seating surface, means for placing said means for supplying in communication with the product contained within the cartridges in order to obtain a beverage; as well as means permitting said beverage leaving the cartridge to be directed towards a beverage collecting container, where said infusion head has a support (11) having at least one hollow (29) forming a housing for at least two cartridges (2,2') of different diameters, characterized in that said hollow (29) has a peripheral annular seat (35) common to several seating flange (6,6') diameters of different cartridges, one or more parts of the external edge of said peripheral seat (35) forming a vertical wall for common indexing of said cartridges (2,2'), characterized in that said hollow (29) is intended to cooperate with at least two injection needles (19,21) of different heights.

7. Coffee maker according to claim 6, characterized in that said injection needles (19,21) are offset radially with respect to the axis of said hollow (29), the longest needle (19) being the furthest from the center.

8. Coffee maker able to function with cartridges containing a beverage-producing product, comprising means for supplying hot water to an infusion head able to receive at least two cartridges (2,2') of different diameters each having at least one flat seating surface, means for placing said means for supplying in communication with the product contained within the cartridges in order to obtain a beverage, as well as means permitting said beverage leaving the cartridge to be directed towards a beverage collecting container, where said infusion head has a support (11) having at least one hollow (29) forming a housing for at least two cartridges (2,2') of different diameters, characterized in that said hollow (29) has a peripheral annular seat (35) common to several seating flange (6,6') diameters of different cartridges, one or more parts of the external edge of said peripheral seat (35) forming a vertical wall for common indexing of said cartridges (2,2'), characterized in that said infusion head has two side-by-side hollows (29,31) in a common support (11).

9. Coffee maker according to claim 8, characterized in that said two hollows (29,31) each have one peripheral annular seat (35,37) presenting at least one common vertical indexing wall, the two seats being located at the same level.

10. Coffee maker according to claim 9, characterized in that said two hollows (29,31) each present a vertical indexing wall (39,40), the two walls being located at one side and the other of a partition (36) separating said hollows (29,31).

* * * * *